Patented Sept. 8, 1931

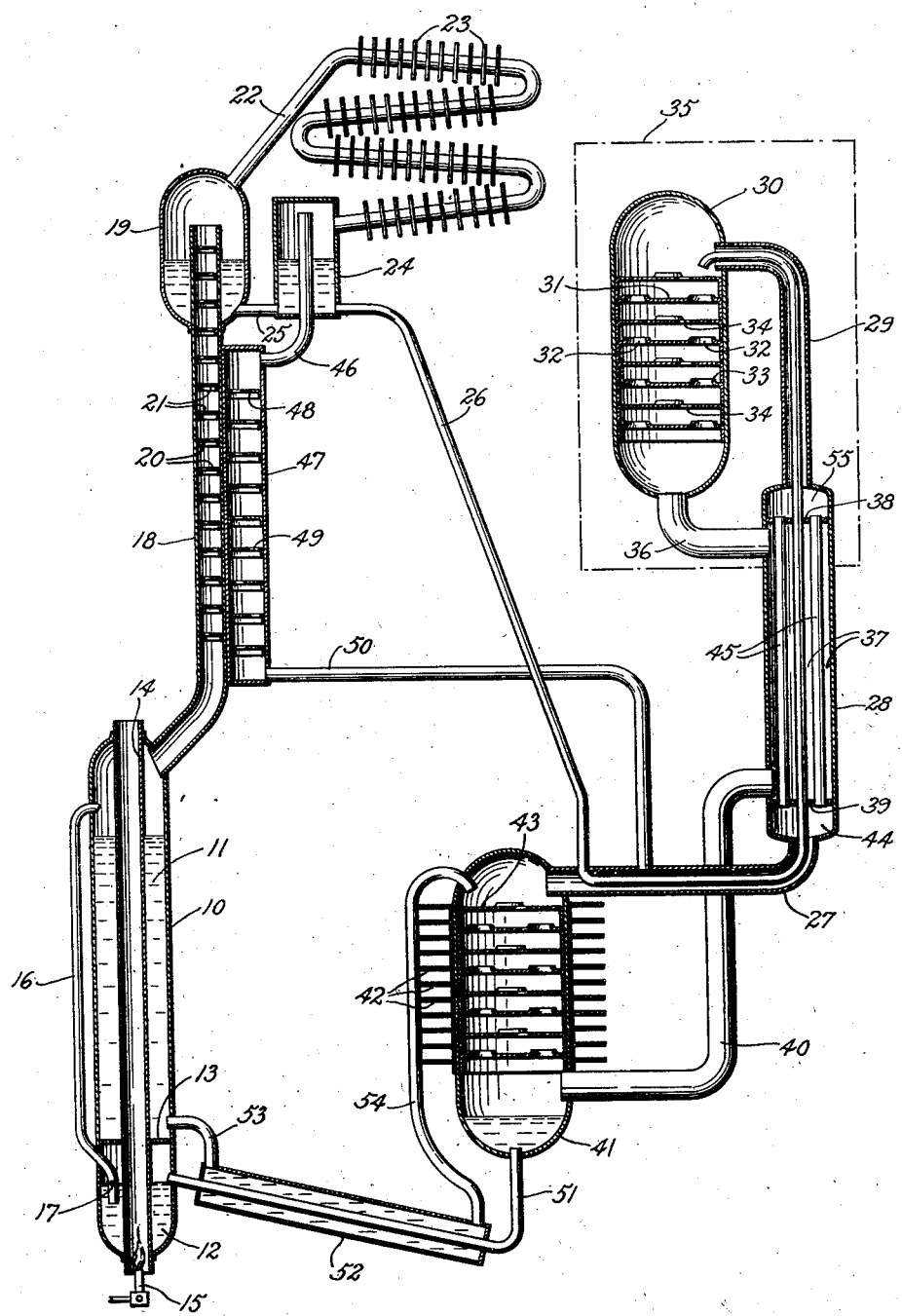

1,822,224

UNITED STATES PATENT OFFICE

DONALD BRANCH KNIGHT, OF BROOKLYN, NEW YORK, ASSIGNOR TO ELECTROLUX SERVEL CORPORATION, OF NEW YORK, N. Y., A CORPORATION OF DELAWARE

REFRIGERATION

Application filed January 9, 1930. Serial No. 419,486.

My invention relates to the art of refrigeration and particularly to refrigerating apparatus of the absorption type wherein an inert gas is used to maintain an equal pressure throughout the apparatus and still more particularly to refrigerating apparatus of this type which utilizes air as a cooling medium for certain heat-giving parts.

Where air is used as a cooling medium the temperature of the cooling medium varies from day to day with changing atmospheric conditions. During the greater part of the year the temperature of the air does not exceed approximately 70 degrees F. while on a few days during the summer this temperature may go to 100 degrees or even higher. If no special provisions were made the operating pressure of an absorption refrigerating apparatus of this type would have to be high enough so that condensation of the refrigerant would take place at the highest atmospheric temperature that would be likely to occur. During the greater part of the time this pressure would be a great deal higher than would be necessary to effect condensation at normal atmospheric temperatures. Such a high pressure is a disadvantage. The rectifier losses become higher at the higher pressures on account of the higher temperatures necessarily maintained. Also at the higher pressures a larger proportion of inert gas must be circulated to produce a certain given refrigerating effect. This increased circulation is attended by losses which reduce the efficiency of the apparatus.

One of the objects of my invention is to provide means for automatically regulating the pressure in accordance with atmospheric temperature conditions so that the pressure will increase as the temperature of the atmosphere increases. Thus, during the greater part of the time the apparatus will operate at a comparatively low pressure which is sufficiently high to effect condensation at normal air temperatures and when the temperature of the air increases the pressure will increase so that condensation will be effected at an increased temperature.

Further objects and advantages will be apparent from the following description considered in connection with the accompanying drawing which forms a part of the specification and which is a diagrammatic cross-sectional view of an absorption refrigerating system embodying the invention.

Referring to the drawing, reference character 10 designates a generator which is divided into a main generator 11 and an auxiliary generator 12 by means of a partition 13. A flue 14 extends centrally through generator 10 and is arranged to be heated by any suitable means as, for instance, by gas burner 15. A thermo-syphon conduit 16 extends downwardly within auxiliary generator 12 and is preferably provided near its lower open end with one or more apertures 17 in the side thereof. The other end of conduit 16 communicates with the upper part of main generator 11.

Communicating with the upper part of main generator 11 is a vapor conduit 18, the other end of which opens into the upper part of a rectifier chamber 19. Within conduit 18 are positioned a series of discs 20 provided with apertures 21 therein. These discs are arranged so that apertures in adjacent discs are not in alignment and hence fluid passing thereto must follow a tortuous path.

Communicating with the upper part of rectifier chamber 19 is a condenser conduit 22, the downwardly extending portion of which is provided with fins 23 in order to obtain a larger surface for heat transfer between the conduit and the fins on the one hand and surrounding air on the other. The lower end of condenser conduit 22 discharges into a liquid separation vessel 24. A conduit 25 connects the lower part of vessel 24 with the lower part of rectifier chamber 19.

A conduit 26 communicates with liquid separation vessel 24 near the bottom thereof and extends downwardly and within a conduit 27, a gas heat exchanger 28 and a conduit 29 to within the upper part of an evaporator 30. Evaporator 30 comprises a closed cylindrical drum within which are positioned a series of discs 31. Discs 31 are provided with one or more apertures 32 surrounded by raised rims 33 and with one or more smaller apertures 34. Evaporator 30 is placed within the compartment to be cooled, here represented diagrammatically by the dot and dash rectangle 35. Communicating with the bottom of evaporator 30 is a conduit 36, the other end of which communicates with a space 37 formed within gas heat exchanger 28 between the tube heads 38 and 39. A conduit 40 connects the other end of space 37 with the lower part of an absorber 41. Absorber 41 is provided with a number of fins or flanges 42 in order to increase the heat radiating surface thereof. Within absorber 41 are positioned a series of discs 43 which may be similar to discs 31 within evaporator 30. Conduit 27 communicates with the upper part of absorber 41 and with a space 44 formed in the lower end of gas heat exchanger 28 between tube head 39 and the adjacent end of heat exchanger 28. A series of tubes 45 are suitably positioned in tube heads 38 and 39 and establish communication between space 44 and a similar space 55 formed in the upper part of the heat exchanger. Conduit 29 connects space 55 with the upper part of evaporator 30.

Opening into the upper part of liquid separation vessel 24 is a conduit 46, the other end of which communicates with one end of an inert gas receiver 47. Receiver 47 is preferably divided into a number of communicating chambers by means of a series of discs 48 having apertures 49 formed therein. The receiver is preferably placed in heat exchange relationship with conduit 18 in order to be warmed thereby. A conduit 50 connects the lower end of receiver 47 with conduit 27 as shown.

A conduit 51 communicates with the bottom of absorber 41, extends within a liquid heat exchange jacket 52 and communicates with auxiliary generator 12. A conduit 53 connects the lower part of main generator 11 with one end of jacket 52 while a conduit 54 connects the other end of this jacket with the upper part of absorber 41. Conduit 54 may be placed in heat exchange relationship with a portion of the flanges 42 on the absorber.

The operation of my invention is as follows:

Generator 10 is partially filled with an absorption liquid, for instance water, in which is dissolved a suitable refrigerant, as ammonia. The portion of the system not occupied by this liquid solution is originally charged with a gas inert with respect to ammonia and not dissolvable in water. This gas is preferably hydrogen.

Upon the application of heat to generator 10 ammonia is driven from solution in main generator 11 and passes in the form of a vapor upwardly through conduit 18 to rectifier chamber 19. Some water vapor necessarily passes along with the ammonia vapor but is condensed within conduit 18, due to this conduit being in heat exchange relation with liquid ammonia within rectifier chamber 19. The water vapor thus condensed passes as a liquid downwardly to conduit 18 and back to auxiliary generator 11.

The substantially pure ammonia vapor passes from chamber 19 into condenser conduit 22 and is here condensed to a liquid due to a cooling action of the surrounding air. The pressure of the ammonia necessary for such condensation to take place is dependent on the temperature of this air. The liquid ammonia formed in condenser conduit 22 passes therefrom into liquid separation vessel 24 and fills this vessel and chamber 19 up to the level at which conduit 26 discharges into evaporator 30. Ammonia vaporized within rectifier chamber 19 due to its absorption of heat resulting from condensation of water vapor within conduit 18 passes into condenser conduit 22 and is again liquefied.

Liquid ammonia passes from vessel 24 through conduit 26 to the upper part of evaporator 30. Here the liquid ammonia comes in intimate contact with hydrogen admitted through conduit 29 and the ammonia evaporates in the presence of this hydrogen. This evaporation requires heat which is absorbed from the surroundings and thus refrigeration is produced within the compartment designated by rectangle 35. The liquid ammonia while evaporating is distributed over discs 31 and may pass from one disc to a lower disc through apertures 34 but is prevented from passing through apertures 32 by the rims 33 formed therearound. The gaseous mixture of ammonia and hydrogen formed in evaporator 30 passes downwardly through apertures 32 in discs 31 and from the bottom of the evaporator through conduit 36 to space 37 in gas heat exchanger 28. From the other end of space 37 the mixture passes through conduit 40 to the lower part of absorber 41. Here the gaseous mixture of ammonia and hydrogen comes into intimate contact with absorption liquid containing but little ammonia in solution which is admitted at the top of the absorber through conduit 54. This liquid absorbs the ammonia while the hydrogen is not absorbed and passes upwardly through the evaporator and through conduit 27 to space 44 in heat exchanger 28. Heat resulting from this absorption process is dissipated into the surrounding air by the aid of fins 42. From space 44 the hydrogen passes through tubes 45 to space 55 and thence to conduit 29 to the upper part of evaporator 30. Liquid ammonia within conduit 26 and gaseous hydrogen within tubes 45 are cooled by the cold gaseous mixture of ammonia and hydrogen in space 37. The circulation of the gases between and through evaporator 30 and absorber 41 is maintained due to the difference in the specific weight of the gases comprising the upward and downward sides of this cycle. Thus the gaseous mixture of ammonia and hydrogen passing downwardly from the evaporator to the absorber has a greater specific weight than the relatively pure hydrogen passing in the opposite direction due to the fact that the specific weight of ammonia is much greater than that of hydrogen.

The strong solution of ammonia and water formed in absorber 41 flows therefrom through conduit 51 to auxiliary generator 12. Here the application of heat causes some of the ammonia to be driven from solution in the form of a gas and this gas enters thermo-syphon conduit 16 through aperture 17 and entraps liquid therein and raises this liquid by well known thermo-syphon action to the upper part of main generator 11. Here more ammonia is driven from solution, as was previously described, and the weak liquid solution passes downwardly and through conduit 53, jacket 52 and conduit 54 to the upper part of absorber 41. The hot weak liquid in jacket 52 is brought in heat exchange relation with the comparatively cool strong liquid in conduit 51.

Thus far it has been assumed that the pressure within the apparatus is such that condensation within condenser conduit 22 will take place at the pervailing temperature of the atmosphere. How such a pressure will be maintained and varied in accordance with variations of atmospheric temperature will now be explained. Inert gas receiver 47 was originally filled with hydrogen and under normal operating conditions of atmospheric temperature practically no circulation through conduit 46, receiver 27 and conduit 50 will take place. However, should the atmospheric temperature increase a certain amount, vaporous ammonia will pass through conduit 22 without being condensed to a liquid due to the fact that this pressure is not sufficiently high for condensation to occur at the increased temperature. This vaporous ammonia, having a great deal larger volume than a corresponding quantity of liquid ammonia, passes through conduit 46 to within receiver 47 and there displaces hydrogen from successive chambers, which hydrogen passes through conduit 50 to conduit 27 and is thus introduced into the hydrogen cycle between the evaporator and the absorber. The ammonia vapor remains in receiver 47 in its expanded gaseous state and any condensation of the same therein is prevented by maintaining receiver 47 at a somewhat elevated temperature due to its heat exchange relationship with conduit 18.

The effect of this uncondensed ammonia in receiver 47 is to increase the pressure existing throughout the entire system and consequently within condenser conduit 22 to such a point that condensation of ammonia within conduit 22 again takes place. The apparatus continues to operate under this increased pressure as long as temperature of the air remains high but when the air temperature is reduced the rate of condensation of ammonia within conduit 22 is accelerated and thus tends to produce a lower pressure in vessel 24. This causes the gaseous ammonia contained within receiver 47 to be drawn therefrom through conduit 46 into vessel 24 and thence into conduit 22 where it is liquefied. The space within receiver 47 thus vacated by the ammonia is again occupied by hydrogen which is drawn from conduit 27 through conduit 50 to the receiver. The purpose of dividing the receiver into chambers by discs 48 is to reduce to a minimum mixing of the ammonia and hydrogen gases.

Without receiver 47, or a similar storage space for hydrogen, the pressure within the entire apparatus would not be appreciably increased by an increase in the temperature of the surrounding air. Assuming conduit 46 to be connected directly to conduit 50 without the interposition of receiver 47, then, upon an increase in atmospheric temperature, vaporous ammonia passing uncondensed through condenser conduit 22 into vessel 24 would pass therefrom into conduits 46 and 50 and, after forcing the comparatively small volume of hydrogen contained in conduits 46 and 50 into conduit 27, would itself pass into conduit 27. From here it would pass to the evaporator and thence to the absorber where it would be absorbed by the water. This absorption would neutralize the tendency to an increased pressure in the system resulting from the non-condensation of the ammonia in the condenser.

By placing receiver 47, which is capable of holding a comparatively large volume of gas, between conduits 46 and 50 the ammonia vapor resulting from non-condensation is held in the receiver while displacing therefrom hydrogen. This hydrogen, when it reaches the absorber, of course is not absorbed and hence the increased pressure resulting from non-condensation is not neutralized by subsequent absorption. In other words, the hydrogen serves to insulate the vaporous ammonia from the absorption liquid. The ammonia in receiver 47 remains in an expanded gaseous state and hence occupies more space in the system than it would ordinarily and thus increases the pressure throughout the system. The size of receiver 47 may be different for different apparatuses and should be selected in accordance with the desired range of operating pressures between that condition where the receiver contains a maximum of inert gas and that condition where the receiver contains a minimum of inert gas.

A further advantage is gained in this apparatus due to the fact that the strength of the solution is automatically reduced as the temperature of the air rises. This results from
the fact that ammonia is withdrawn from circulation and stored in receiver 47 and the resulting weaker solution gives the apparatus
a higher capacity which is desirable, as during periods of high air temperature the load
on the refrgerator is usually greater than at
other times. It will be seen that receiver 47
constitutes what may be termed an inactive
portion of the refrigerating system, as do also
conduits 46 and 60, since none of the steps of
the active portion of the system, such as condensation, evaporation or absorption of the
refrigerant takes place therein. It will be
understood that the generator, condenser, absorber and evaporator and the conduits in
which the refrigerant, absorption liquid and
inert gas go through complete continuous
cycles are parts of the active portion of the
system.

While I have illustrated and described a
more or less specific embodiment of my invention it is to be understood that modifications
thereof, such as would occur to one skilled in
the art, are included within its spirit. For
instance, conduit 50 could communicate with
other points of the cycle between the evaporator and absorber, such as with the evaporator itself. Also, the invention could be used in
conjunction with apparatus cooled by other
mediums than air, such as water, the temperature of which in some parts of the country
varies greatly from time to time. The scope
of my invention is to be limited only by the
appended claims viewed in the light of prior
art.

What I claim is:

1. That improvement in the art of refrigeration by the aid of a system containing
a refrigerant fluid and an additional fluid
for equalizing pressure which comprises storing an excess of said additional fluid under
normal operating conditions and circulating
the stored additional fluid in the system when
the pressure in the system increases.

2. That improvement in the art of refrigeration by the aid of a system containing
a refrigerant fluid and an additional fluid
for equalizing pressure which comprises storing an excess of said additional fluid under
normal operating conditions, displacing said
excess by refrigerant fluid when the pressure
in said system increases, storing the displacing refrigerant fluid and circulating the displaced excess additional fluid in the system.

3. That improvement in the art of refrigeration by the aid of a system containing
a refrigerating fluid, an absorption fluid and
a pressure equalizing fluid which comprises
utilizing a medium outside of the system to
effect liquefaction of the refrigerant fluid
and varying the pressure within said system
in accordance with the temperature of the
cooling medium by varying the amount of
refrigerant in the active portion of the system.

4. That improvement in the art of refrigeration by the aid of a system containing
a refrigerant fluid, an absorption fluid and a
pressure equalizing fluid, which comprises
vaporizing said refrigerant fluid, condensing
a portion of the vaporized refrigerant fluid,
allowing a portion of the vaporized refrigerant fluid to remain in the vapor state to increase the pressure in the system and insulating said last mentioned portion from said
absorption liquid by said pressure equalizing
fluid.

5. That improvement in the art of refrigeration by the aid of an absorption system
which comprises circulating a refrigerant
through a main cycle, circulating a pressure
equalizing gas through an auxiliary cycle
which coincides in part with said main cycle,
liquefying refrigerant at a point in said main
cycle under normal conditions, allowing a
portion of said refrigerant to pass said point
in the main cycle without being liquefied
under abnormal conditions, storing excess
pressure equalizing gas in said system adjacent to said auxiliary cycle and utilizing uncondensed refrigerant to displace the stored
pressure equalizing fluid into said auxiliary
cycle under abnormal conditions.

6. That improvement in the art of refrigeration by the aid of a system containing a
refrigerant fluid, an absorption fluid and a
pressure equalizing fluid and utilizing a
medium outside the system to effect liquefaction of said refrigerant fluid which comprises
decreasing the quantity of refrigerant fluid
circulated through said system and increasing the quantity of pressure equalizing fluid
circulated through said system upon an increase in the temperature of said medium.

7. That improvement in the art of refrigeration through the agency of a system embodying a refrigerant fluid and an additional
fluid in the presence of which the refrigerant
fluid evaporates which comprises varying the
proportion of the refrigerant fluid to the
additional fluid in the active portion of the
system by accumulating some of the refrigerant fluid in a gaseous state in an inactive
portion of the system.

8. A refrigerating apparatus comprising a
generator, a condenser, an evaporator, an absorber, conduits connecting the aforesaid elements to form a main cycle for the circulation of refrigerant through said generator,
condenser, evaporator and absorber, a first
auxiliary cycle for the circulation of an inert
gas through said evaporator and absorber and
a second auxiliary cycle for the circulation
of absorption fluid through said generator
and absorber and means effective upon an increase of the temperature of said condenser
for decreasing the quantity of refrigerant
circulating in said main cycle and increasing the quantity of inert gas circulating in said first auxiliary cycle.

9. An absorption refrigerating apparatus comprising a generator, a condenser, an evaporator, an absorber, means for supplying vaporous refrigerant to said condenser, means for conveying liquid refrigerant from said condenser to said evaporator, means for supplying absorption liquid to said absorber, means for circulating an inert gas between and through said evaporator and absorber, a receiver, a communication between said receiver and said condenser, and a communication between said receiver and said last mentioned means, said communication between the receiver and said last mentioned means being arranged to drain the receiver free of liquid.

10. A refrigerating apparatus comprising a generator, a condenser, an evaporator, an absorber, conduits connecting the aforesaid elements to form a main cycle for the circulation of refrigerant through said generator, condenser, evaporator and absorber, a first auxiliary cycle for the circulation of an inert gas through said evaporator and absorber and a second auxiliary cycle for the circulation of absorption fluid through said generator and absorber, a receiver for normally containing a reserve supply of inert gas connected to said condenser and a conduit connecting said receiver with said auxiliary cycle, the arrangement being such that the reserve supply of inert gas is forced through the last mentioned conduit, into said first auxiliary cycle upon an increase of the temperature of said condenser above normal, said receiver constituting an inactive portion of the refrigerating apparatus.

11. A refrigerating apparatus comprising a generator, a condenser, an evaporator, an absorber, conduits connecting the aforesaid elements to form a main cycle for the circulation of refrigerant through said generator, condenser, evaporator and absorber, a first auxiliary cycle for the circulation of an inert gas through said evaporator and absorber and a second auxiliary cycle for the circulation of absorption fluid through said generator and absorber, a receiver comprising a plurality of communicating chambers for normally containing a reserve supply of inert gas and connected so that vaporous refrigerant is introduced into successive chambers of said receiver when the temperature of said condenser rises, and a connection between said receiver and said first auxiliary cycle said receiver constituting an inactive portion of the refrigerating apparatus.

12. A refrigerating apparatus comprising a generator, a condenser, an evaporator, an absorber, conduits connecting the aforesaid elements to form a main cycle for the circulation of refrigerant through said generator, condenser, evaporator and absorber, a first auxiliary cycle for the circulation of an inert gas through said evaporator and absorber and a second auxiliary cycle for the circulation of absorption fluid through said generator and absorber, a receiver for normally containing a reserve supply of inert gas connected so that vaporous refrigerant is introduced into said receiver when the temperature of said condenser rises and a connection between said receiver and said first auxiliary cycle, said receiver constituting an inactive portion of the refrigerating apparatus.

13. That improvement in the art of refrigeration by the aid of an absorption system containing a refrigerant dissolvable in an absorption fluid which comprises varying the strength of the solution of refrigerant in absorption fluid in accordance with temperature changes of the surrounding air by storing refrigerant in the vaporous state.

14. That improvement in the art of refrigeration by the aid of an absorption system containing a refrigerant dissolvable in an absorption fluid which comprises reducing the strength of the solution of refrigerant in absorption fluid upon an increase in the temperature of the surrounding air by storing refrigerant in the vaporous state.

15. That improvement in the art of refrigeration by the aid of a system containing a refrigerant fluid and an additional fluid, which system is heated and cooled and which comprises an active portion and an inactive portion, which consists in storing a quantity of said additional fluid in the inactive portion of the system under certain operating conditions and variably transferring some of the additional fluid between the inactive portion and the active portion of the system in accordance with temperature changes of the cooling medium.

16. That improvement in the art of refrigeration by the aid of a system containing a refrigerant fluid and an inert gas, which system is heated and cooled and which comprises an active portion and an inactive portion, which consists in storing a quantity of said inert gas in the inactive portion of the system under certain operating conditions and variably transferring inert gas between the inactive portion and the active portion of the system in accordance with temperature changes of the cooling medium.

17. That improvement in the art of refrigeration by the aid of a system containing a refrigerant fluid and an additional fluid, which system is heated and cooled and which comprises an active portion and an inactive portion, which consists in storing a quantity of said additional fluid in the inactive portion of the system under certain operating conditions and automatically transferring some of the additional fluid between the inactive portion of the active portion of the system in accordance with temperature changes of the cooling medium.

18. That improvement in the art of refrigeration by the aid of a system containing a refrigerant fluid and an inert gas, which system is heated and cooled and which comprises an active portion and an inactive portion, which consists in storing a quantity of said inert gas in the inactive portion of the system under certain operating conditions and automatically transferring inert gas between the inactive portion and the active portion of the system in accordance with temperature changes of the cooling medium.

19. That improvement in the art of refrigeration by the aid of a system containing a refrigerant fluid and an additional fluid, which system is heated and cooled and which comprises an active portion and an inactive portion, which consists in storing a quantity of said additional fluid in the inactive portion of the system under certain operating conditions and transferring stored additional fluid from the inactive portion to the active portion of the system on rise of temperature of the cooling medium.

20. That improvement in the art of refrigeration by the aid of a system containing a refrigerant fluid and an inert gas, which system is heated and cooled and which comprises an active portion and an inactive portion, which consists in storing a quantity of said inert gas in the inactive portion of the system under certain operating conditions and automatically transferring stored inert gas from the inactive portion to the active portion of the system on rise of temperature of the cooling medium.

21. That improvement in the art of refrigeration by the aid of a system containing a refrigerant fluid and an additional fluid, which system is heated and cooled and which comprises an active portion and an inactive portion, which consists in storing a quantity of said additional fluid in the inactive portion of the system under certain operating conditions, variably transferring some of the additional fluid between the inactive portion and the active portion of the system in accordance with temperature changes of the cooling medium and heating the inactive portion.

22. That improvement in the art of refrigeration by the aid of a system containing a refrigerant fluid and an inert gas, which system is heated and cooled and which comprises an active portion and an inactive portion, which consists in storing a quantity of said inert gas in the inactive portion of the system under certain operating conditions, variably transferring inert gas between the inactive portion and the active portion of the system in accordance with temperature changes of the cooling medium and heating the inactive portion.

23. That improvement in the art of refrigeration by the aid of a system containing a refrigerant fluid and an additional fluid, which system is heated and cooled and which comprises an active portion and an inactive portion, which consists in storing a quantity of said additional fluid in the inactive portion of the system under certain operating conditions, automatically transferring some of the additional fluid between the inactive portion and the active portion of the system in accordance with temperature changes of the cooling medium and heating the inactive portion.

24. That improvement in the art of refrigeration by the aid of a system containing a refrigerant fluid and an inert gas, which system is heated and cooled and which comprises an active portion and an inactive portion, which consists in storing a quantity of said inert gas in the inactive portion of the system under certain operating conditions, automatically transferring inert gas between the inactive portion and the active portion of the system in accordance with temperature changes of the cooling medium and heating the inactive portion.

25. That improvement in the art of refrigeration by the aid of a system containing a refrigerant fluid and an additional fluid, which system is heated and cooled and which comprises an active portion and an inactive portion, which consists in storing a quantity of said additional fluid in the inactive portion of the system under certain operating conditions, transferring stored additional fluid from the inactive portion to the active portion of the system on rise of temperature of the cooling medium and heating the inactive portion.

26. That improvement in the art of refrigeration by the aid of a system containing a refrigerant fluid and an inert gas, which system is heated and cooled and which comprises an active portion and an inactive portion, which consists in storing a quantity of said inert gas in the inactive portion of the system under certain operating conditions, automatically transferring stored inert gas from the inactive portion to the active portion of the system on rise of temperature of the cooling medium and heating the inactive portion.

27. That improvement in the art of refrigeration by the aid of an absorption system containing a refrigerant dissolved in an absorption liquid and which is heated and cooled, which comprises varying the strength of the solution of refrigerant in absorption fluid in accordance with temperature changes of the cooling medium by storing refrigerant in the vaporous state.

28. That improvement in the art of refrigeration by the aid of an absorption system containing a refrigerant dissolved in an absorption liquid and which is heated and cooled, which comprises reducing the strength of the solution of refrigerant in absorption fluid upon an increase in temperature of the cooling medium by storing refrigerant in the vaporous state.

29. An absorption refrigerating apparatus comprising a generator, a condenser, an evaporator, an absorber, means for supplying vaporous refrigerant to said condenser, means for conveying liquid refrigerant from said condenser to said evaporator, means for supplying absorption liquid to said absorber, means for circulating an inert gas between and through said evaporator and absorber, a receiver, means for heating said receiver, a communication between said receiver and said condenser, and a communication between said receiver and the inert gas circulating means, said receiver constituting an inactive portion of the system and being constructed to store vaporous refrigerant.

30. An absorption refrigerating apparatus comprising a generator, a condenser, an evaporator, an absorber, means for supplying vaporous refrigerant to said condenser, means for conveying liquid refrigerant from said condenser to said evaporator, means for supplying absorption liquid to said absorber, means for circulating an inert gas between and through said evaporator and absorber, a receiver, means for heating said receiver, a communication between said receiver and said condenser, and a communication between said receiver and the inert gas circulating means, the last mentioned communication being arranged to drain liquid from said receiver.

In testimony whereof I have affixed my signature.

DONALD BRANCH KNIGHT.